US008612964B2

(12) United States Patent
Jalaldeen et al.

(10) Patent No.: US 8,612,964 B2
(45) Date of Patent: Dec. 17, 2013

(54) MIGRATING UNIFIED MODELING LANGUAGE MODELS ACROSS UNIFIED MODELING LANGUAGE PROFILES

(75) Inventors: Ahamed Jalaldeen, Karnataka (IN); Siddharth N. Purohit, Allen, TX (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 13/011,988

(22) Filed: Jan. 24, 2011

(65) Prior Publication Data

US 2012/0192144 A1 Jul. 26, 2012

(51) Int. Cl.
*G06F 9/44* (2006.01)

(52) U.S. Cl.
USPC .......... 717/168

(58) Field of Classification Search
USPC .......... 717/104, 136
See application file for complete search history.

(56) References Cited

U.S. PATENT DOCUMENTS 6,038,393 A 3/2000 Iyengar et al.
2006/0130008 A1* 6/2006 Nguyen et al. .......... 717/136
2007/0067756 A1 3/2007 Garza
2009/0150856 A1* 6/2009 Elaasar et al. .......... 717/104
2009/0193063 A1 7/2009 Leroux et al.

* cited by examiner

*Primary Examiner* — Don Wong
*Assistant Examiner* — Deric Ortiz
(74) *Attorney, Agent, or Firm* — Schmeiser, Olsen & Watts; John Pivnichny

(57) ABSTRACT

A method and system for migrating a UML model across UML profiles. After retrieving a UML model, a source UML element, a source UML profile, a source stereotype, and a source meta-class, the target UML profile, stereotype and meta-class are looked up in a mapping table based on the source UML profile, stereotype, and meta-class. The target UML profile is applied on the UML model. Based on the source meta-class being different from the target meta-class, relationships of the source UML element are retrieved, a target UML element is created, the relationships are copied to the target UML element, and the source UML element is removed from the UML model. The target stereotype is applied to the target UML element. The source stereotype is removed from the target UML element. The source UML profile is removed from the UML model.

12 Claims, 8 Drawing Sheets

100

EXISTING UNIFIED MODELING LANGUAGE (UML) MODEL CREATED USING A SET OF UML PROFILES (E.G., SET OF UNSUPPORTED UML PROFILES) 106

COMPUTER SYSTEM 102

PROGRAM CODE FOR MIGRATING UNIFIED MODELING LANGUAGE (UML) MODELS ACROSS UML PROFILES 104

MAPPING TABLE THAT MAPS SOURCE UML ELEMENTS TO TARGET UML ELEMENTS 108

UML MODEL RESULTING FROM A MIGRATION TO A NEW SET OF UML PROFILES (E.G., SET OF SUPPORTED UML PROFILES) 110

MIGRATING UNIFIED MODELING LANGUAGE MODELS ACROSS UNIFIED MODELING LANGUAGE PROFILES

FIELD OF THE INVENTION

The present invention relates to a data processing method and system for migrating a Unified Modeling Language model from one set of Unified Modeling Language profiles to another set of Unified Modeling Language profiles.

BACKGROUND

For legal and business purposes, a supplier of reusable software components requires that a development tool used to develop a software component sold to a customer must be supported by the supplier (e.g., owned by or licensed to the supplier). The supplier is not permitted to deliver a software component to the customer if the software component had been developed using an older version of a development tool, which is no longer supported by the supplier. Known migration techniques that migrate across different versions of Unified Modeling Language (UML) profiles of a software component provide only minor changes to the UML profile while keeping the UML profile fundamentally the same. Such known migration techniques fail to ensure that the software component previously developed using the older version of the development tool is supported by the supplier. Furthermore, a manual technique that migrates each and every element of a UML model requires a substantial effort at a high cost. Thus, there exists a need to overcome at least one of the preceding deficiencies and limitations of the related art.

BRIEF SUMMARY

Embodiments of the present invention provide a method of migrating a Unified Modeling Language (UML) model from a source UML profile to a target UML profile. The method comprises:

a computer system retrieving a UML model;

the computer system retrieving a source UML element included in the UML model;

the computer system retrieving a source UML profile, a source stereotype applied on the source UML element, and a source meta-class, wherein the source stereotype is created in the source UML profile that extends the source meta-class of the source UML element;

the computer system looking up the target UML profile, a target stereotype and a target meta-class in a mapping table based on the source UML profile, the source stereotype, and the source meta-class;

the computer system determining the target UML profile is not applied on the UML model, and in response thereto, the computer system applying the target UML profile on the UML model;

the computer system determining the source meta-class is different from the target meta-class, and in response thereto, the computer system: retrieving one or more relationships of the source UML element; creating a target UML element of the target meta-class on the UML model; copying the one or more relationships of the source UML element to the target UML element; and removing the source UML element from the UML model;

the computer system applying the target stereotype to the target UML element;

the computer system removing the source stereotype from the target UML element; and the computer system removing the source UML profile from the UML model.

A system, program product and a process for supporting computing infrastructure where the process provides at least one support service are also described and claimed herein, where the system, program product and process for supporting computing infrastructure correspond to the aforementioned method.

Embodiments of the present invention provide a system and method for identifying a list of stereotypes used in UML models and migrating UML models across UML profiles. Furthermore, the present invention may provide a system and method for creating new target UML profiles and simulating a migration of UML models across UML profiles. The technique for migrating UML models across UML profiles disclosed herein extend the lifetime of high-value software assets in UML model format. Furthermore, embodiments of the present invention may provide the UML migration across UML profiles while avoiding substantial effort and cost.

DETAILED DESCRIPTION

Overview

Figure 1:
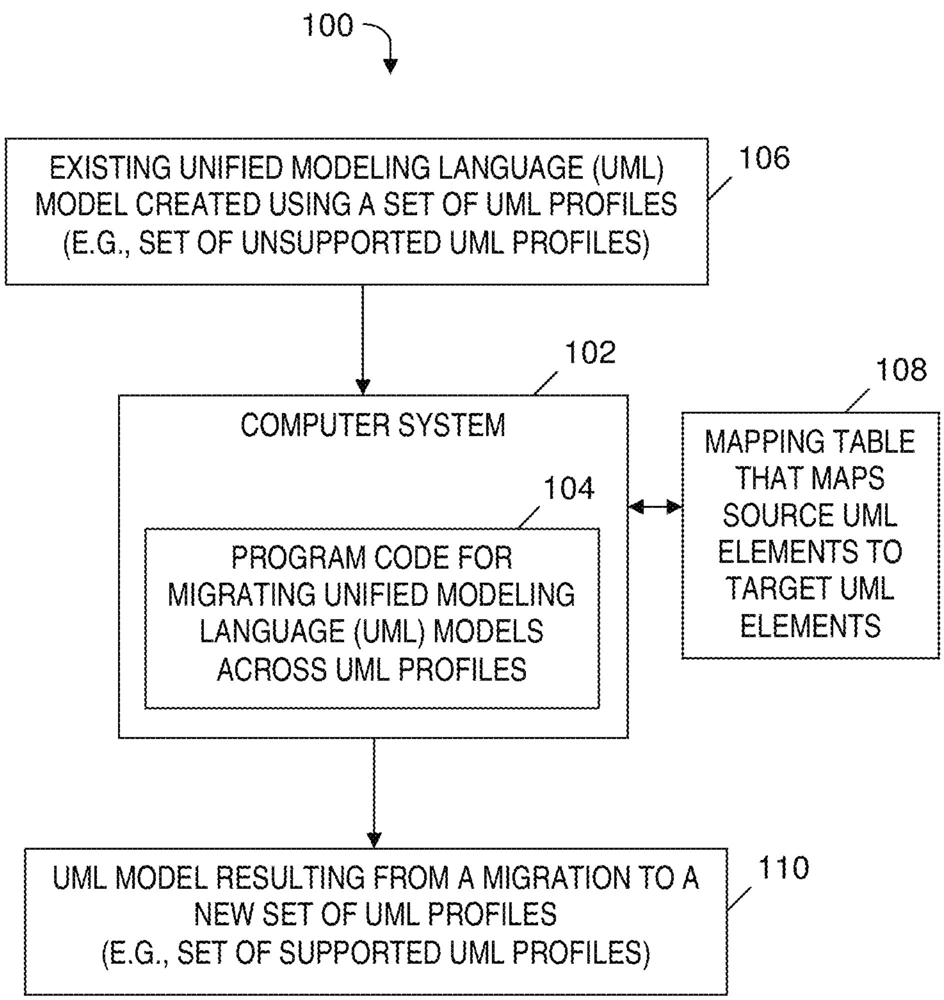
FIG. 1 is a block diagram of a system for migrating UML models across UML profiles, in accordance with embodiments of the present invention.

Embodiments of the present invention may provide a system and method for migrating a UML model that had been created using old, unsupported, incompatible UML profiles to a new set of UML profiles, where the new set of UML profiles are supported by a supplier of a software component represented by the UML model, and where the new set of UML profiles is not a revision of old UML profiles. That is, the migration technique of the present invention is not disclosing a migration of UML models or UML profiles from an old version of UML (e.g., UML2 1.x) to a new version of UML (e.g., UML2 2.0) that involves adding a limited number of stereotypes to an existing set of stereotypes. Instead, the migration technique of the present invention may replace each and every old stereotype with a new set of stereotypes and may result in the definition of a new meta-model itself, which has a different name, extends from a different meta-class, and has different semantics from the UML model as it existed prior to the migration. Embodiments of the present invention may also provide techniques for identifying a list of stereotypes of old UML profiles used in UML models; establishing a mapping between stereotypes of old UML profiles and new UML profiles; simulating the migration of the UML model across UML profiles, and replacing stereotypes of old UML profiles with new UML profiles.

Definitions

Terminology used herein is defined in this section.

UML: Unified Modeling Language is a standardized general-purpose modeling language used in the field of software engineering. UML is managed, and was created by, the Object Management Group (OMG®) located in Needham, Mass. UML includes a set of graphic notation techniques to create visual models of software-intensive systems.

Meta-Class (a.k.a. Type): An element of a standard meta-model provided by UML. A meta-class may be extended through one or more stereotypes. Examples of meta-classes in UML include Class and Interface.

UML Model: An abstract model of a specific system. A UML model includes elements such as packages, classes, and associations. UML diagrams corresponding to a UML model are graphical representations of parts of the UML model. UML diagrams contain graphical elements (e.g., nodes connected by paths) that represent elements in the UML model. As an example, in a diagram for a package (i.e., a collection of UML elements), two associated classes defined in the package will be represented by two class symbols and an association path connecting the two class symbols.

UML profile: Provides a generic extension mechanism for customizing UML models for particular domains and platforms. The extension mechanism provided by a UML profile allows the refinement of standard semantics in a strictly additive manner, so that the refinement cannot contradict standard semantics. UML profiles are defined using extension constructs (i.e., stereotypes, tag definitions, and/or constraints) that are applied to specific UML model elements (e.g., Classes, Attributes, Operations, and Activities). A UML profile is a collection of such extension constructs that collectively customize a UML model for a particular domain (e.g., aerospace, healthcare, or financial) or platform (e.g., Java® Platform, Enterprise Edition (Java® EE) or Microsoft® .NET software framework). "SOA Profile" UML profile is one example of a new UML profile created for a service-oriented architecture.

Stereotype: A stereotype is an extension construct in UML that defines how an existing meta-class may be extended, and enables the use of platform or domain specific terminology or notation in place of, or in addition to, the ones used for the extended meta-class. A stereotype allows designers to extend the vocabulary of UML in order to create new UML elements that are derived from existing UML elements, but that have specific properties that are suitable for a particular problem domain. An example of a new stereotype that does not exist in a standard UML meta-class is a "ServiceMessage" stereotype created in the "SOA Profile" UML Profile that extends "Class" meta-class.

UML Element: An instantiation of a meta-class. One or more stereotypes may be optionally applied on a UML element. A UML element may have relationships with one or more other UML elements.

Rational® Software Architect: An advanced model-driven development tool that leverages model-driven development with the UML for creating well-architected applications and services.

Rational® Software Modeler: A robust collaborative platform for visual modeling and design.

System for Migrating UML Models Across UML Profiles

FIG. 1 is a block diagram of a system for migrating UML models across UML profiles, in accordance with embodiments of the present invention. System 100 includes a computer system 102 that carries out instructions in computer program code 104 for migrating UML models across UML profiles. As used herein, migrating a UML model across UML profiles is defined as migrating the UML model from an old set of UML profiles to a new set of UML profiles. Program code 104 receives input 106 that includes an existing UML model of a software component that is supplied by a software component supplier, where the existing UML model was created using a set of UML profile(s). In one embodiment, the UML profile(s) used to create the received UML model are currently unsupported by the software component supplier. Program code 104 accesses a mapping table 108 stored in a computer data repository (not shown). The mapping table 108 stores a mapping of source UML elements to target UML elements, which includes a mapping from stereotypes of old UML profiles to stereotypes of new UML profiles. The computer data repository stores the mapping table that maps source UML elements to target UML elements prior to the computer system 102 running program code 104. By utilizing the mapping table 108, program code 104 identifies target UML elements and outputs a UML model resulting from a migration to a new set of UML profile(s). In one embodiment, the new set of UML profile(s) is supported by the software component supplier. The functionality of the components in system 100 is further described below with respect to FIGS. 2A-2B, FIG. 3, FIG. 4 and FIGS. 5A-5B.

Retrieving Stereotypes Used in UML Models

Figure 2A:
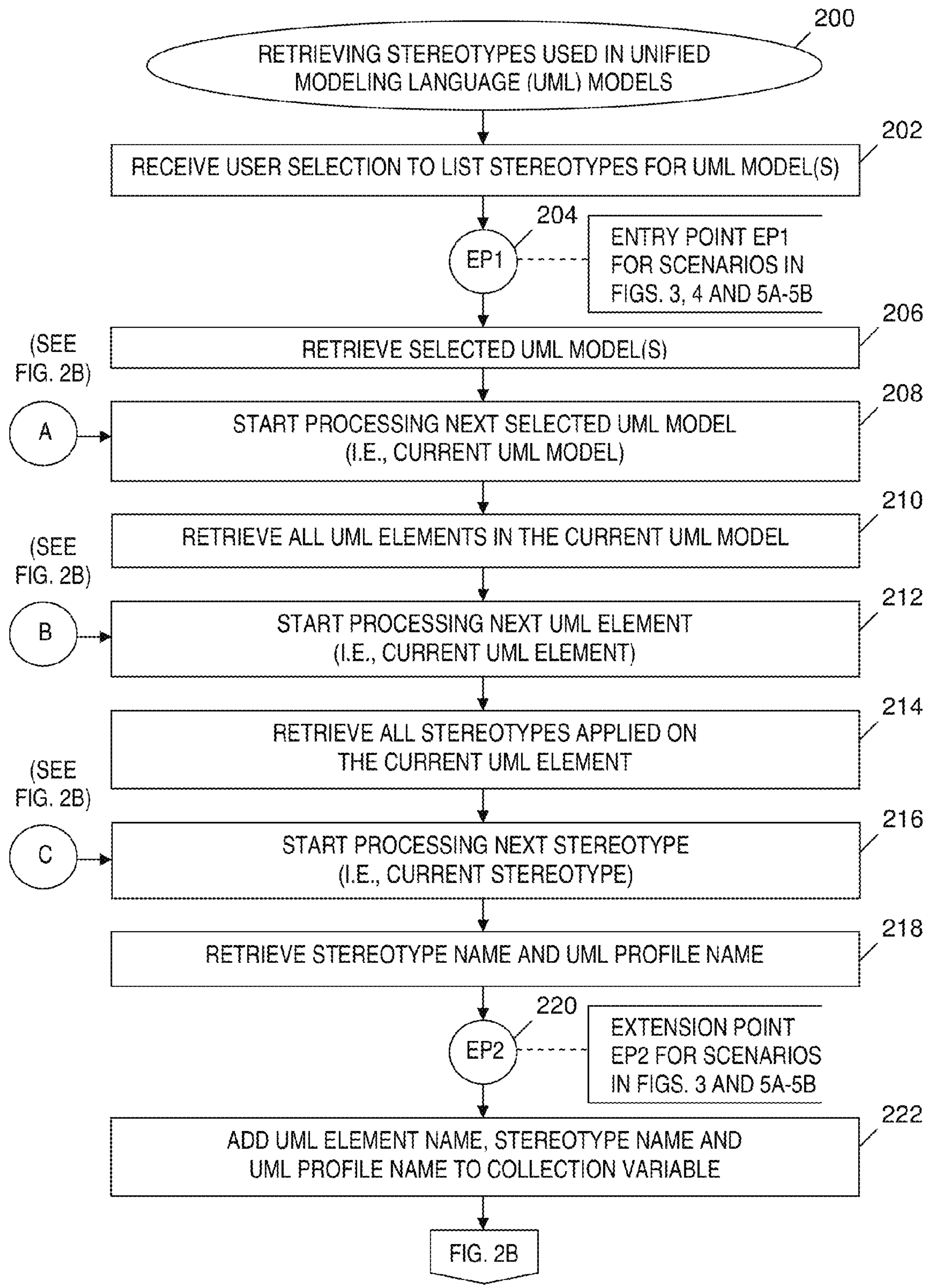
FIGS. 2A-2B depicts a flowchart of a process of retrieving stereotypes used in UML models that are to be migrated in the system of FIG. 1, in accordance with embodiments of the present invention.
Figure 2B:
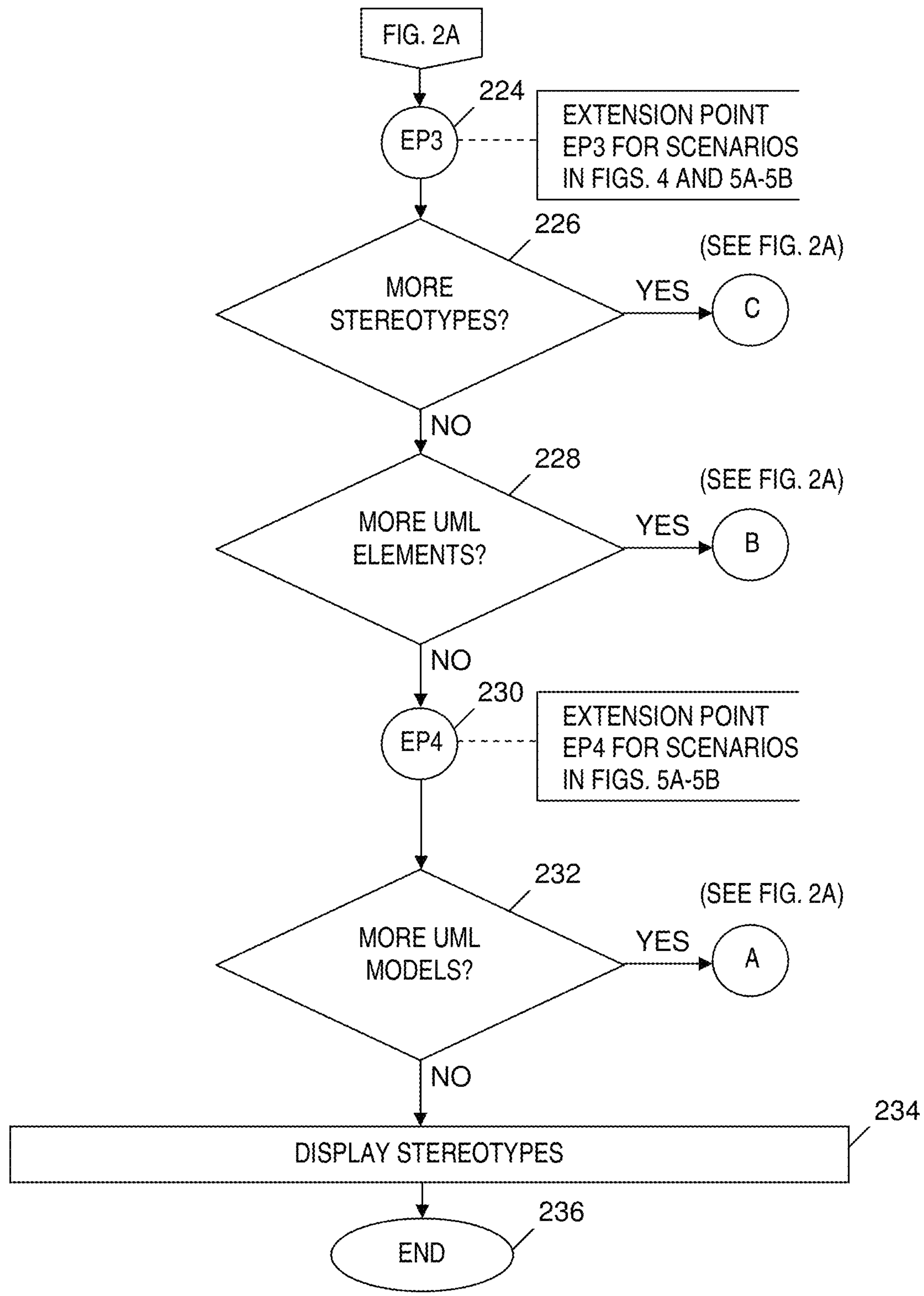

FIGS. 2A-2B depicts a flowchart of a process of retrieving stereotypes used in UML models that are to be migrated in the system of FIG. 1, in accordance with embodiments of the present invention. The process of retrieving stereotypes of old UML profiles used in UML models that are to be migrated across UML profiles starts at step 200 in FIG. 2A. In step 202, computer system 102 (see FIG. 1) receives a user selection of one or more UML models for which stereotypes are to be listed. The one or more UML models whose selection is received in step 202 are also referred to in this section as the selected UML model(s). Entry point EP1 204, which follows step 202, is an entry point for processes described in FIG. 3, FIG. 4 and FIGS. 5A-5B.

In step 206, which follows entry point EP1, computer system 102 (see FIG. 1) retrieves the selected UML model(s). Step 208 starts a first loop. Each iteration of the first loop processes a corresponding selected UML model until every one of the selected UML model(s) is processed. In step 208, computer system 102 (see FIG. 1) starts processing a next UML model of the selected UML model(s). If step 208 is being performed in a first iteration of the first loop that starts at step 208, then the UML model whose processing is started in step 208 is a first UML model of the selected UML models. In this section, the UML model being processed in step 208 is also referred to as the current UML model. In step 210, computer system 102 (see FIG. 1) retrieves all the UML elements in the current UML model.

In step 212, computer system 102 (see FIG. 1) starts processing a next UML element (a.k.a. the current UML element) of the UML elements retrieved in step 210 and retrieves a UML element name of the current UML element. Step 212 also includes computer system 102 (see FIG. 1) starting the processing of a current meta-class (i.e., the meta-class of the current UML element). If step 210 is being performed in a first iteration of a second loop that starts at step 212, then the current UML element is a first UML element of the UML elements retrieved in step 210. In step 214, computer system 102 (see FIG. 1) retrieves all stereotypes applied on the current UML element.

In step 216, computer system 102 (see FIG. 1) starts processing a next stereotype (a.k.a. the current stereotype) of the stereotypes retrieved in step 214. If step 216 is being performed in a first iteration of a third loop that starts at step 216, then the current stereotype is a first stereotype of the stereotypes retrieved in step 214. In step 218, computer system 102 (see FIG. 1) retrieves a stereotype name and a UML profile name from the current stereotype. The retrieved stereotype name identifies the current stereotype and the retrieved UML profile name identifies the UML profile in which the current stereotype is created.

Figure 3:
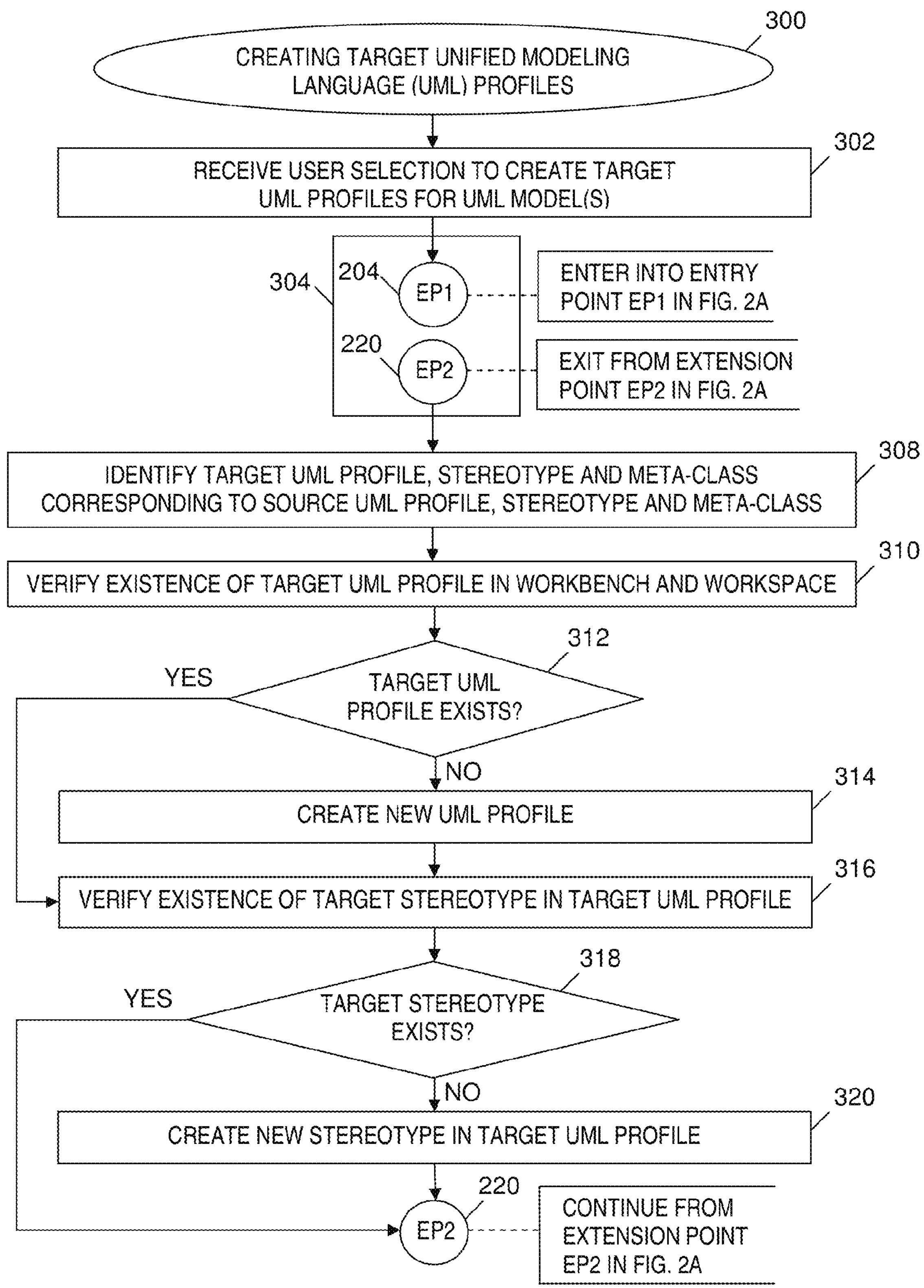
FIG. 3 is a flowchart of a process of programmatically creating target UML profiles for the UML models that are to be migrated in the system of FIG. 1, in accordance with embodiments of the present invention.
Figure 5A:
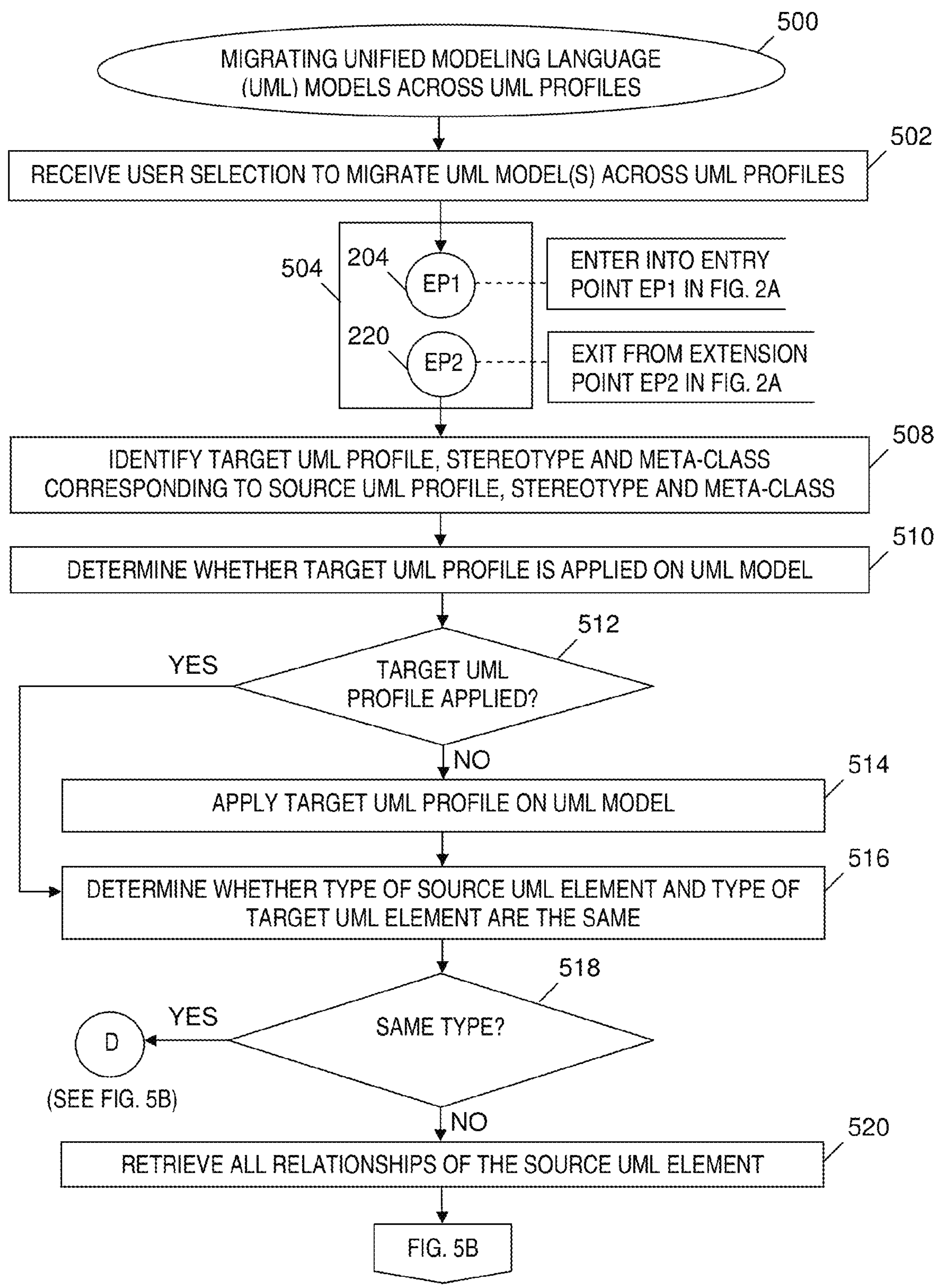
FIGS. 5A-5B depict a flowchart of a process of migrating UML models across UML profiles in the system of FIG. 1, in accordance with embodiments of the present invention.
Figure 5B:
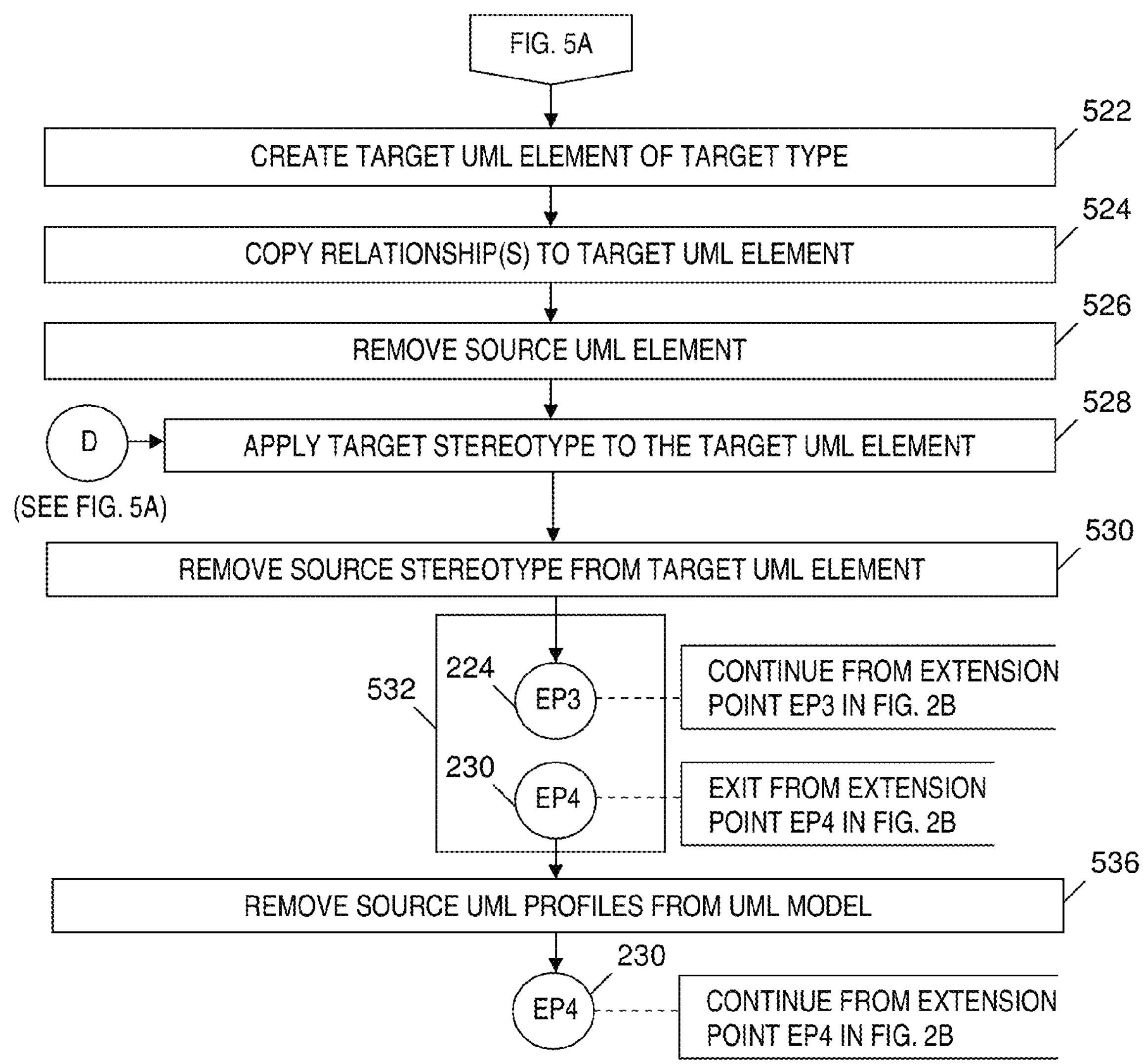

Extension point EP2 220, which follows step 218, is an extension point for processes described in FIG. 3 and FIGS. 5A-5B.

In step 222, which follows extension point EP2, computer system 102 (see FIG. 1) adds the UML element name retrieved in step 212, the stereotype name retrieved in step 218, and the UML profile name retrieved in step 218 to a collection variable. The collection variable may be stored in the memory of computer system 102 (see FIG. 1). After step 222, the process of FIGS. 2A-2B continues with extension point EP3 224 in FIG. 2B.

Figure 4:
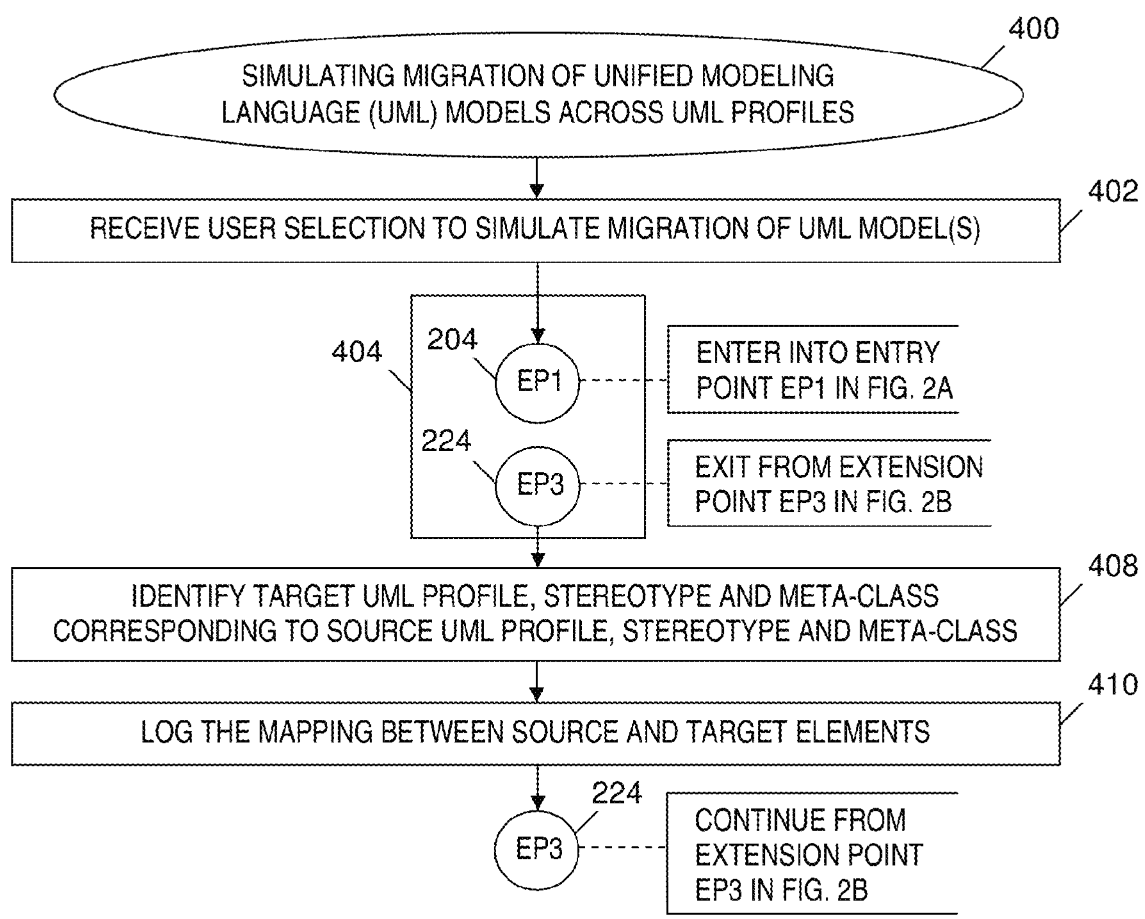
FIG. 4 is a flowchart of a process of simulating migration of UML models across UML profiles in the system of FIG. 1, in accordance with embodiments of the present invention.

Extension point EP3 in FIG. 2B is an extension point used in the processes described in FIG. 4 and FIGS. 5A-5B.

In step 226, which follows extension point EP3, computer system 102 (see FIG. 1) determines whether or not there is another stereotype of the stereotypes retrieved in step 214 (see FIG. 2A) (a.k.a. the retrieved stereotypes) that is not yet processed in the third loop that began at step 216 (see FIG. 2A). If computer system 102 (see FIG. 1) determines in step 226 that there is another stereotype of the retrieved stereotypes that has not yet been processed in the third loop, then the Yes branch of step 226 is taken and a subsequent iteration of the third loop begins at step 216 (see FIG. 2A) by starting the processing of the next stereotype of the retrieved stereotypes.

If computer system 102 (see FIG. 1) determines in step 226 that there is no other stereotype of the retrieved stereotypes that has not yet been processed by the third loop, then the No branch of step 226 is taken and the next step is step 228.

In step 228, computer system 102 (see FIG. 1) determines whether or not there is another UML element of the UML elements retrieved in step 210 (see FIG. 2A) (a.k.a. the retrieved UML elements) that is not yet processed in the second loop that began at step 212 (see FIG. 2A). If computer system 102 (see FIG. 1) determines in step 228 that there is another UML element of the retrieved UML elements that has not yet been processed in the second loop, then the Yes branch of step 228 is taken and a subsequent iteration of the second loop begins at step 212 (see FIG. 2A) by starting the processing of the next UML element of the retrieved UML elements.

If computer system 102 (see FIG. 1) determines in step 228 that there is no other UML element of the retrieved UML elements that has not yet been processed in the second loop, then the No branch of step 228 is taken to extension point EP4 230. Extension point EP4 is an extension point used in the process described in FIGS. 5A-5B.

In step 232, which follows extension point EP4, computer system 102 (see FIG. 1) determines whether or not there is another UML model of the selected UML model(s) that is not yet processed in the first loop that began at step 208 (see FIG. 2A). If computer system 102 (see FIG. 1) determines in step 232 that there is another UML model of the selected UML models that has not yet been processed in the first loop, then the Yes branch of step 232 is taken and a subsequent iteration of the first loop begins at step 208 (see FIG. 2A) by starting the processing of the next UML model of the selected UML models.

If computer system 102 (see FIG. 1) determines in step 232 that there is no other UML model of the selected UML model(s) that has not yet been processed in the first loop, then the No branch of step 232 is taken and the next step is step 234.

In step 234, computer system 102 (see FIG. 1) initiates a display of a list of stereotypes by retrieving from the collection variable (see step 222 in FIG. 2A) the UML element names, stereotype names and UML profile names that identify the stereotypes. The process of FIGS. 2A-2B ends at step 236.

Creating Target UML Profiles

FIG. 3 is a flowchart of a process of programmatically creating target UML profiles for the UML models that are to be migrated in the system of FIG. 1, in accordance with embodiments of the present invention. The process of creating target UML profiles for UML model(s) being migrated across UML profiles starts at step 300. In step 302, computer system 102 (see FIG. 1) receives a user selection of one or more UML models for which target UML profiles are to be created. In this section, the one or more UML models whose selection is received in step 302 are also referred to as the selected UML model(s). After step 302, a sub-process 304 is performed that includes the steps in the process of FIGS. 2A-2B between entry point EP1 204 (see also FIG. 2A) and extension point EP2 220 (see also FIG. 2A).

In step 308, computer system 102 (see FIG. 1) identifies a target UML profile (a.k.a. the identified target UML profile), a target stereotype (a.k.a. the identified target stereotype), and a target meta-class that correspond, respectively, to a source UML profile, a source stereotype, and a source meta-class. That is, the computer system retrieves the target UML profile, target stereotype, and target meta-class from mapping table 108 (see FIG. 1) that maps the source UML profile, source stereotype, and source meta-class to the target UML profile, target stereotype, and target meta-class, respectively. The target stereotype is created in the target UML profile that extends the target meta-class. The source stereotype is the current stereotype being processed in step 216 (see FIG. 2A), the source meta-class is the current meta-class being processed in step 212 (see FIG. 2A), and the source UML profile is the UML profile whose name is retrieved in step 218 (see FIG. 2A) (i.e., the UML profile in which the current stereotype is created).

In step 310, computer system 102 (see FIG. 1) verifies the existence of the identified target UML profile in a workbench (i.e., a UML-based modeling tool) and in a workspace (i.e., a file system).

If computer system 102 determines in step 312 that the identified target UML profile does not exist in the workbench or in the workspace, then the No branch of step 312 is taken and step 314 is performed. In step 314, computer system 102 (see FIG. 1) creates the identified target UML profile as a new UML profile in the workspace. Step 316 follows step 314.

Returning to step 312, if computer system 102 determines that the identified target UML profile exists in the workbench or workspace, then the Yes branch of step 312 is taken and step 316 is performed.

In step 316, computer system 102 (see FIG. 1) verifies the existence of the identified target stereotype in the identified target UML profile. If computer system 102 (see FIG. 1) determines in step 318 that the identified target stereotype exists in the identified target UML profile, then the Yes branch of step 318 is taken and the process of FIG. 3 continues from extension point EP2 220 (see also FIG. 2A).

If computer system 102 (see FIG. 1) determines in step 318 that the identified target stereotype does not exist in the identified target UML profile, then the No branch of step 318 is taken and step 320 is performed. In step 320, computer system 102 (see FIG. 1) creates the identified target stereotype as a new stereotype in the identified target UML profile. Following step 320, the process of FIG. 3 continues from extension point EP2 220 (see also FIG. 2A).

Simulating Migration of UML Models Across UML Profiles

FIG. 4 is a flowchart of a process of simulating migration of UML models across UML profiles in the system of FIG. 1, in accordance with embodiments of the present invention. The process of simulating the migration of UML models across UML profiles begins at step 400. In step 402, computer system 102 (see FIG. 1) receives a user selection of one or more UML models whose migrations across UML profiles are to be simulated. In this section, the one or more UML models whose selection is received in step 402 are also referred to as the selected UML model(s). After step 402, a sub-process 404 is performed that includes the steps in the process of FIGS. 2A-2B between entry point EP1 204 (see also FIG. 2A) and extension point EP3 224 (see also FIG. 2B).

In step 408, computer system 102 (see FIG. 1) identifies a target UML profile (a.k.a. the identified target UML profile), a target stereotype (a.k.a. the identified target stereotype), and a target meta-class that correspond, respectively, to a source UML profile, a source stereotype, and a source meta-class. That is, the computer system retrieves the target UML profile, target stereotype, and target meta-class from mapping table 108 (see FIG. 1) that maps the source UML profile, source stereotype, and source meta-class to the target UML profile, target stereotype, and target meta-class, respectively. The target stereotype is created in the target UML profile that extends the target meta-class. The source stereotype is the current stereotype being processed in step 216 (see FIG. 2A), the source meta-class is the current meta-class being processed in step 212 (see FIG. 2A), and the source UML profile is the UML profile whose name is retrieved in step 218 (see FIG. 2A) (i.e., the UML profile in which the current stereotype is created).

In step 410, computer system 102 (see FIG. 1) logs (i.e., stores) and initiates a display of a mapping between instantiations of the source UML profile, source stereotype and source meta-class and corresponding instantiations of the target UML profile, target stereotype and target meta-class, respectively. The mapping logged in step 410 may be stored, for example, in a computer data file (e.g., text file) or in a database. After step 410, the process of FIG. 4 continues with the steps in FIGS. 2A-2B that follow extension point EP3 224 (see also FIG. 2B).

The process of FIG. 4 provides a simulation snapshot of a migration of a UML model across UML profiles, but does not make changes to physical models, and does not remove stereotypes or apply new stereotypes.

FIGS. 5A-5B depict a flowchart of a process of migrating UML models across UML profiles in the system of FIG. 1, in accordance with embodiments of the present invention. The process of migrating UML models across UML profiles begins at step 500. In step 502, computer system 102 (see FIG. 1) receives a user selection of one or more UML models that are to be migrated across UML profiles. In this section, the one or more UML models whose selection is received in step 502 are also referred to as the selected UML model(s). After step 502, a sub-process 504 is performed that includes the steps in the process of FIGS. 2A-2B between entry point EP1 204 (see also FIG. 2A) and extension point EP2 220 (see also FIG. 2A).

In step 508, computer system 102 (see FIG. 1) identifies a target UML profile (a.k.a. the identified target UML profile), a target stereotype (a.k.a. the identified target stereotype), and a target meta-class that correspond, respectively, to a source UML profile, a source stereotype, and a source meta-class. That is, the computer system retrieves the target UML profile, target stereotype, and target meta-class from mapping table 108 (see FIG. 1) that maps the source UML profile, source stereotype, and source meta-class to the target UML profile, target stereotype, and target meta-class, respectively, by performing a lookup in the mapping table. The target stereotype is created in the target UML profile that extends the target meta-class. The source stereotype is the current stereotype being processed in step 216 (see FIG. 2A), the source meta-class is the current meta-class being processed in step 212 (see FIG. 2A), and the source UML profile is the UML profile whose name is retrieved in step 218 (see FIG. 2A) (i.e., the UML profile in which the current stereotype is created).

In step 510, computer system 102 (see FIG. 1) determines whether the target UML profile is applied on the current UML model. If computer system 102 (see FIG. 1) determines in step 512 that the target UML profile is not applied on the current UML model, then the No branch of step 512 is taken and step 514 is performed. In step 514, computer system 102 (see FIG. 1) applies the target UML profile on the current UML model. In step 514, the computer system 102 (see FIG. 1) adds the definition of the target UML profile to the current UML model (i.e., makes the definition of the target UML profile available at the UML model level).

Returning to step 512, if computer system 102 (see FIG. 1) determines that the target UML profile is applied on the current UML model, then the Yes branch of step 512 is taken and step 516 is performed.

In step 516, computer system 102 (see FIG. 1) determines whether the type (i.e., meta-class) of the source UML element is the same as the type (i.e., meta-class) of the corresponding target UML element. If computer system 102 (see FIG. 1) determines in step 518 that the types of the source and target UML element are not the same, then the No branch of step 518 is taken and step 520 is performed. In step 520, computer system 102 (see FIG. 1) retrieves from the source UML element all of the one or more relationships of the source UML element. After step 520, step 522 in FIG. 5B is performed.

In step 522, computer system 102 (see FIG. 1) creates in the current UML model a new target UML element having the aforementioned type (i.e., meta-class) of the target UML element. In step 524, computer system 102 (see FIG. 1) copies the relationship(s) retrieved in step 520 (see FIG. 5A) to the target UML element created in step 522. In step 526, computer system 102 (see FIG. 1) removes the source UML element from the current UML model.

In step 528, which follows step 526, computer system 102 (see FIG. 1) applies the target stereotype identified in step 508 (see FIG. 5A) to the new target UML element created in step 522.

Returning to step 518 (see FIG. 5A), if computer system 102 (see FIG. 1) determines that the types of the source and target UML elements are the same, then the Yes branch of step 518 (see FIG. 5A) is taken and step 528 in FIG. 5B is performed. In step 528 that follows the Yes branch of step 518 (see FIG. 5A), computer system 102 (see FIG. 1) applies the target stereotype identified in step 508 (see FIG. 5A) to the existing target UML element (i.e., the target UML element whose type was compared to the type of the source UML element in step 516 in FIG. 5A).

In step 530, computer system 102 (see FIG. 1) removes the source stereotype from the target UML element. The actual migration of the UML model from one UML profile to another UML profile occurs at the stereotype level at steps 528 and 530 (i.e., replacing a source stereotype with the target stereotype by adding the target stereotype in step 528 and removing the source stereotype in step 530), whereas the migration at the UML profile level occurs at step 514 (see FIG. 5A) and step 536 (i.e., applying the new UML profile to the UML model in step 514 and removing the old source UML profile from the UML model in step 536).

Following step 530, a sub-process 532 is performed, which includes the steps in the process of FIGS. 2A-2B that are in between extension point EP3 224 (see also FIG. 2B) and extension point EP4 (see also FIG. 2B).

In step 536, computer system 102 (see FIG. 1) removes source UML profiles from the current UML model. Following step 536, the process of FIGS. 5A-5B continues from extension point EP4 230 (see also FIG. 2B).

The process of FIGS. 5A-5B provides a migration of a UML model from one set of UML profiles to another set of UML profiles that incorporates meta-class changes while retaining the relationships with other elements. The process of FIGS. 5A-5B also applies new UML profiles to a UML model prior to migration and removes old UML profiles from the UML model after the migration. Furthermore, the process of FIGS. 5A-5B may be extended so that the computer system 102 (see FIG. 1) maintains a change history and statistics (e.g., elements count, stereotype migrations count, stereotypes count, etc.).

Computer System

Figure 6:
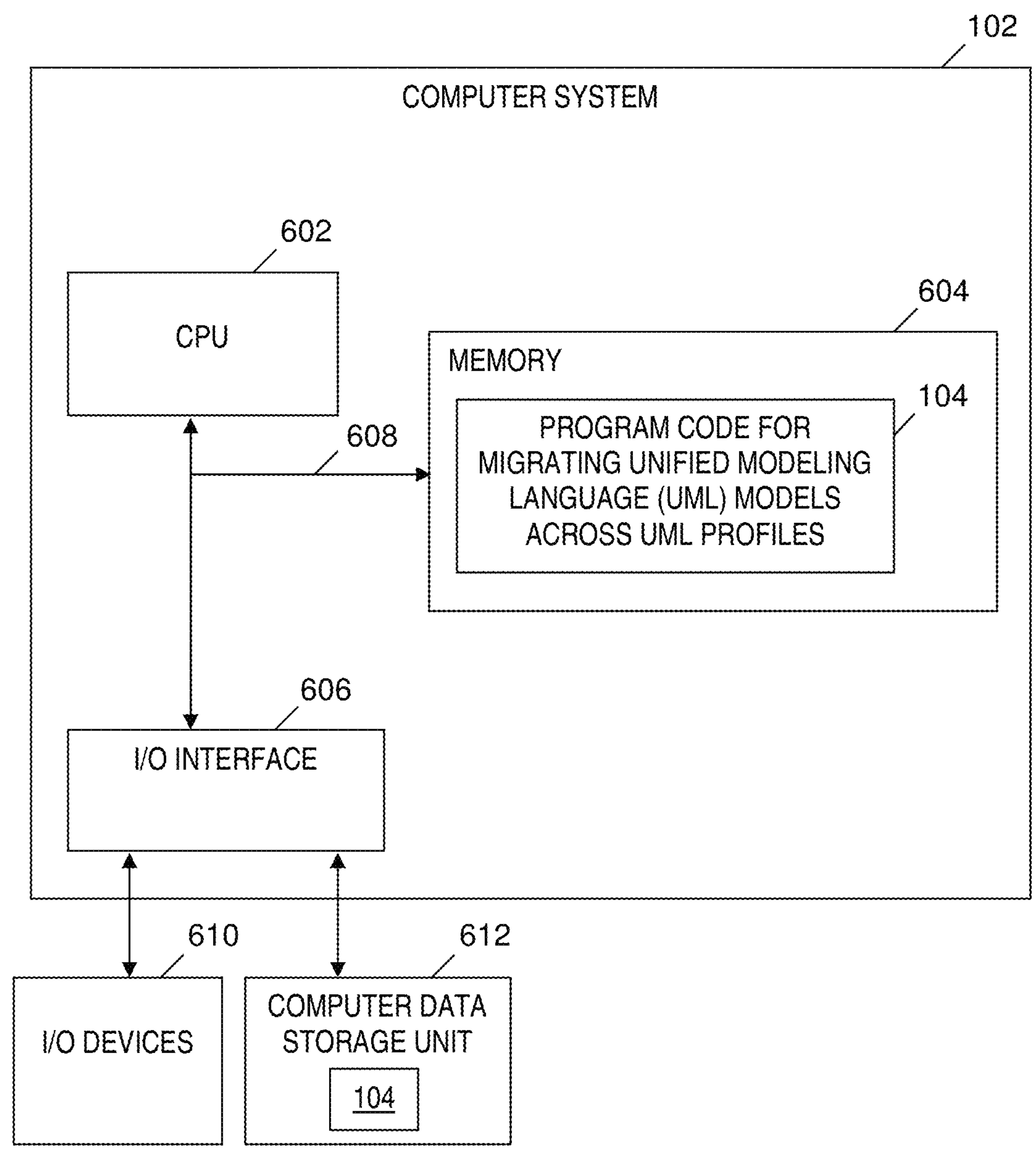
FIG. 6 is a block diagram of a computer system that is included in the system of FIG. 1 and that implements the processes of FIGS. 2A-2B, FIG. 3, FIG. 4, and FIGS. 5A-5B, in accordance with embodiments of the present invention.

FIG. 6 is a block diagram of a computer system that is included in the system of FIG. 1 and that implements the processes of FIGS. 2A-2B, FIG. 3, FIG. 4, and FIGS. 5A-5B, in accordance with embodiments of the present invention. Computer system 102 generally comprises a central processing unit (CPU) 602, a memory 604, an input/output (I/O) interface 606, and a bus 608. Further, computer system 102 is coupled to I/O devices 610 and a computer data storage unit 612. CPU 602 performs computation and control functions of computer system 102, including carrying out instructions included in program code 104 to migrate UML models across UML profiles, where the instructions are carried out by CPU 602 via memory 604. CPU 602 may comprise a single processing unit, or be distributed across one or more processing units in one or more locations (e.g., on a client and server).

Memory 604 may comprise any known computer-readable storage medium, which is described below. In one embodiment, cache memory elements of memory 604 provide temporary storage of at least some program code (e.g., program code 104) in order to reduce the number of times code must be retrieved from bulk storage while instructions of the program code are carried out. Moreover, similar to CPU 602, memory 604 may reside at a single physical location, comprising one or more types of data storage, or be distributed across a plurality of physical systems in various forms. Further, memory 604 can include data distributed across, for example, a local area network (LAN) or a wide area network (WAN).

I/O interface 606 comprises any system for exchanging information to or from an external source. I/O devices 610 comprise any known type of external device, including a display device (e.g., monitor), keyboard, mouse, printer, speakers, handheld device, facsimile, etc. Bus 608 provides a communication link between each of the components in computer system 102, and may comprise any type of transmission link, including electrical, optical, wireless, etc.

I/O interface 606 also allows computer system 102 to store information (e.g., data or program instructions such as program code 104) on and retrieve the information from computer data storage unit 612 or another computer data storage unit (not shown). Computer data storage unit 612 may comprise any known computer-readable storage medium, which is described below. For example, computer data storage unit 612 may be a non-volatile data storage device, such as a magnetic disk drive (i.e., hard disk drive) or an optical disc drive (e.g., a CD-ROM drive which receives a CD-ROM disk).

Memory 604 and/or storage unit 612 may store computer program code 104 that includes instructions that are carried out by CPU 602 via memory 604 for migrating UML models across UML profiles.

Further, memory 604 may include other systems not shown in FIG. 6, such as an operating system (e.g., Linux) that runs on CPU 602 and provides control of various components within and/or connected to computer system 102.

Storage unit 612 and/or one or more other computer data storage units (not shown) that are coupled to computer system 102 may store mapping table 108 (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module." Furthermore, an embodiment of the present invention may take the form of a computer program product embodied in one or more computer-readable medium(s) (e.g., memory 604 and/or computer data storage unit 612) having computer-readable program code (e.g., program code 104) embodied or stored thereon.

Any combination of one or more computer-readable mediums (e.g., memory 604 and computer data storage unit 612) may be utilized. The computer-readable medium may be a computer-readable signal medium or a computer-readable storage medium. In one embodiment the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 104) for use by or in connection with a system (e.g., computer system 102), apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 104) embodied on a computer-readable medium may be transmitted using any appropriate medium, including but not limited to wireless, wireline, optical fiber cable, RF, etc., or any suitable combination of the foregoing.

Computer program code (e.g., program code 104) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 6. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2B, FIG. 3, FIG. 4, and FIGS. 5A-5B) and/or block diagrams of methods, apparatus (systems) (e.g., FIG. 1 and FIG. 6), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 104). These computer program instructions may be provided to a processor (e.g., CPU 602) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer-readable medium (e.g., memory 604 or computer data storage unit 612) that can direct a computer (e.g., computer system 102), other programmable data processing apparatus, or other devices to function in a particular manner, such that the instructions (e.g., program 104) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 104) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to migrating UML models across UML profiles. Thus, an embodiment of the present invention discloses a process for supporting computer infrastructure, wherein the process comprises providing at least one support service for at least one of integrating, hosting, maintaining and deploying computer-readable code (e.g., program code 104) in a computer system (e.g., computer system 102) comprising a processor (e.g., CPU 602), wherein the processor carries out instructions contained in the code causing the computer system to migrate UML models across UML profiles.

In another embodiment, the invention provides a method that performs the process steps of the invention on a subscription, advertising and/or fee basis. That is, a service provider, such as a Solution Integrator, can offer to create, maintain, support, etc. a process of migrating UML models across UML profiles. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2A-2B, FIG. 3, FIG. 4 and FIGS. 5A-5B and the block diagrams in FIG. 1 and FIG. 6 illustrate the architecture, functionality, and operation of possible implementations of systems, methods, and computer program products according to various embodiments of the present invention. In this regard, each block in the flowchart or block diagrams may represent a module, segment, or portion of code (e.g., program code 104), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of migrating a Unified Modeling Language (UML) model from an old UML profile to a new UML profile, said method comprising:

said computer system retrieving a plurality of old stereotypes, said old stereotypes extending respective first meta-classes in said UML model, said plurality of old stereotypes being all stereotypes included in an old UML profile, a definition of said old UML profile in said UML model specifying a first customization of said UML model, said old UML profile no longer being supported by a supplier of a software component represented by said UML model;

said computer system determining, from a mapping table, a mapping between said old stereotypes and respective new stereotypes included in a plurality of new stereotypes, between said old UML profile and a new UML profile, and between said first meta-classes and respective second meta-classes;

based on said mapping between said old UML profile and said new UML profile, based on said old UML profile no longer being supported by said supplier, and based on said new UML profile being supported by said supplier, said computer system adding a definition of said new UML profile to said UML model, said definition of said new UML profile specifying a second customization of said UML model, and said new UML profile being supported by said supplier of said software component;

based on said mapping between said old stereotypes and said new stereotypes, based on said old UML profile no longer being supported by said supplier, based on said new UML profile being supported by said supplier, and subsequent to said adding said definition of said new UML profile to said UML model, said computer system adding said new stereotypes and said second meta-classes to said new UML profile, said new stereotypes added to said new UML profile extending said second meta-classes, respectively, in said new UML profile;

based on said mapping between said old stereotypes and said new stereotypes, based on said adding said new stereotypes and said second meta-classes to said UML model, based on said old UML profile no longer being supported by said supplier, based on said new UML profile being supported by said supplier, and subsequent to said adding said definition of said new UML profile to said UML model, said computer system removing said plurality of old stereotypes from said UML model so that said plurality of old stereotypes are replaced with said plurality of new stereotypes in said UML model; and based on said mapping between said old UML profile and said new UML profile, based on said old UML profile no longer being supported by said supplier, based on said new UML profile being supported by said supplier, and subsequent to said removing said plurality of old stereotypes from said UML model, said computer system removing said definition of said old UML profile from said UML model.

2. A computer system comprising:

a processor;

a computer-readable memory coupled to said processor; and a computer-readable tangible storage device coupled to said processor, said storage device including program code configured to be carried out by said processor via said memory to implement a method of migrating a Unified Modeling Language (UML) model from an old UML profile to a new UML profile, said method comprising:

said computer system retrieving a plurality of old stereotypes, said old stereotypes extending respective first meta-classes in said UML model, said plurality of old stereotypes being all stereotypes included in an old UML profile, a definition of said old UML profile in said UML model specifying a first customization of said UML model, said old UML profile no longer being supported by a supplier of a software component represented by said UML model;

said computer system determining, from a mapping table, a mapping between said old stereotypes and respective new stereotypes included in a plurality of new stereotypes, between said old UML profile and a new UML profile, and between said first meta-classes and respective second meta-classes;

based on said mapping between said old UML profile and said new UML profile, based on said old UML profile no longer being supported by said supplier, and based on said new UML profile being supported by said supplier, said computer system adding a definition of said new UML profile to said UML model, said definition of said new UML profile specifying a second customization of said UML model, sand said new UML profile being supported by said supplier of said software component;

based on said mapping between said old stereotypes and said new stereotypes, based on said old UML profile no longer being supported by said supplier, based on said new UML profile being supported by said supplier, and subsequent to said adding said definition of said new UML profile to said UML model, said computer system adding said new stereotypes and said second meta-classes to said new UML profile, said new stereotypes added to said new UML profile extending said second meta-classes, respectively, in said new UML profile;

based on said mapping between said old stereotypes and said new stereotypes, based on said adding said new stereotypes and said second meta-classes to said UML model, based on said old UML profile no longer being supported by said supplier, based on said new UML profile being supported by said supplier, and subsequent to said adding said definition of said new UML profile to said UML model, said computer system removing said plurality of old stereotypes from said UML model so that said plurality of old stereotypes are replaced with said plurality of new stereotypes in said UML model; and based on said mapping between said old UML profile and said new UML profile, based on said old UML profile no longer being supported by said supplier, based on said new UML profile being supported by said supplier, and subsequent to said removing said plurality of old stereotypes from said UML model, said computer system removing said definition of said old UML profile from said UML model.

3. A computer program product comprising a computer-readable, tangible storage device coupled to a processor of a computer system, said storage device having computer-readable program code stored therein, said computer-readable program code containing instructions that are carried out by said processor to implement a method of migrating a Unified Modeling Language (UML) model from an old UML profile to a new UML profile, said method comprising:

said computer system retrieving a plurality of old stereotypes, said old stereotypes extending respective first meta-classes in said UML model, said plurality of old stereotypes being all stereotypes included in an old UML profile, a definition of said old UML profile in said UML model specifying a first customization of said UML model, said old UML profile no longer being supported by a supplier of a software component represented by said UML model;

said computer system determining, from a mapping table, a mapping between said old stereotypes and respective new stereotypes included in a plurality of new stereotypes, between said old UML profile and a new UML profile, and between said first meta-classes and respective second meta-classes;

based on said mapping between said old UML profile and said new UML profile, based on said old UML profile no longer being supported by said supplier, and based on said new UML profile being supported by said supplier, said computer system adding a definition of said new UML profile to said UML model, said definition of said new UML profile specifying a second customization of said UML model, sand said new UML profile being supported by said supplier of said software component;

based on said mapping between said old stereotypes and said new stereotypes, based on said old UML profile no longer being supported by said supplier, based on said new UML profile being supported by said supplier, and subsequent to said adding said definition of said new UML profile to said UML model, said computer system adding said new stereotypes and said second meta-classes to said new UML profile, said new stereotypes added to said new UML profile extending said second meta-classes, respectively, in said new UML profile;

based on said mapping between said old stereotypes and said new stereotypes, based on said adding said new stereotypes and said second meta-classes to said UML model, based on said old UML profile no longer being supported by said supplier, based on said new UML profile being supported by said supplier, and subsequent to said adding said definition of said new UML profile to said UML model, said computer system removing said plurality of old stereotypes from said UML model so that said plurality of old stereotypes are replaced with said plurality of new stereotypes in said UML model; and based on said mapping between said old UML profile and said new UML profile, based on said old UML profile no longer being supported by said supplier, based on said new UML profile being supported by said supplier, and subsequent to said removing said plurality of old stereotypes from said UML model, said computer system removing said definition of said old UML profile from said UML model.

4. A process for supporting computing infrastructure, said process comprising providing at least one support service for at least one of creating, integrating, hosting, maintaining, and deploying computer-readable code in a computer system comprising a processor, wherein said processor carries out instructions contained in said code causing said computer system to perform a method of migrating a Unified Modeling Language (UML) model from an old UML profile to a new UML profile, said method comprising:

said computer system retrieving a plurality of old stereotypes, said old stereotypes extending respective first meta-classes in said UML model, said plurality of old stereotypes being all stereotypes included in an old UML profile, a definition of said old UML profile in said UML model specifying a first customization of said UML model, said old UML profile no longer being supported by a supplier of a software component represented by said UML model;

said computer system determining, from a mapping table, a mapping between said old stereotypes and respective new stereotypes included in a plurality of new stereotypes, between said old UML profile and a new UML profile, and between said first meta-classes and respective second meta-classes;

based on said mapping between said old UML profile and said new UML profile, based on said old UML profile no longer being supported by said supplier, and based on said new UML profile being supported by said supplier, said computer system adding a definition of said new UML profile to said UML model, said definition of said new UML profile specifying a second customization of said UML model, sand said new UML profile being supported by said supplier of said software component;

based on said mapping between said old stereotypes and said new stereotypes, based on said old UML profile no longer being supported by said supplier, based on said new UML profile being supported by said supplier, and subsequent to said adding said definition of said new UML profile to said UML model, said computer system adding said new stereotypes and said second meta-classes to said new UML profile, said new stereotypes added to said new UML profile extending said second meta-classes, respectively, in said new UML profile;

based on said mapping between said old stereotypes and said new stereotypes, based on said adding said new stereotypes and said second meta-classes to said UML model, based on said old UML profile no longer being supported by said supplier, based on said new UML profile being supported by said supplier, and subsequent to said adding said definition of said new UML profile to said UML model, said computer system removing said plurality of old stereotypes from said UML model so that said plurality of old stereotypes are replaced with said plurality of new stereotypes in said UML model; and based on said mapping between said old UML profile and said new UML profile, based on said old UML profile no longer being supported by said supplier, based on said new UML profile being supported by said supplier, and subsequent to said removing said plurality of old stereotypes from said UML model, said computer system removing said definition of said old UML profile from said UML model.

5. The method of claim 1, further comprising:

subsequent to said determining said mapping and prior to said adding said definition of said new UML profile, said computer system determining said new UML profile exists in a UML-based modeling tool and in a file system;

based on said new UML profile existing in said UML-based modeling tool and in said file system, said computer system determining whether a new stereotype included in said plurality of new stereotypes exists in said new UML profile;

in response to said determining said new stereotype does not exist in said new UML profile, said computer system performing the steps of:

adding a name of said new stereotype and a name of said new UML profile to a collection variable;

determining names of all other new stereotypes included in said plurality of new stereotypes are included in said collection variable;

subsequent to said adding said name of said new stereotype and said determining names of all other new stereotypes are included in said collection variable, retrieving from said collection variable said name of said new stereotype, said names of all other new stereotypes; and initiating display of a list of stereotypes based on said retrieved name of said new stereotype and said retrieved names of all other new stereotypes.

6. The method of claim 1, further comprising:

subsequent to said adding said definition of said new UML profile to said UML model, said computer system determining a first meta-class included in said first meta-classes is different from a respective second meta-class included in said second meta-classes; and based on said first meta-class being different from said second meta-class, said computer system performing the steps of:

retrieving one or more relationships of an instantiation of said first meta-class;

creating an instantiation of said second meta-class having a type specified by said second meta-class;

subsequent to said retrieving said one or more relationships and said creating said instantiation of said second meta-class, copying said one or more relationships to said instantiation of said second meta-class; and removing said instantiation of said first meta-class from said UML model, wherein said adding said new stereotypes to said new UML profile includes applying a new stereotype included in said plurality of new stereotypes to said instantiation of said second meta-class.

7. The computer system of claim 2, wherein said method further comprises:

subsequent to said determining said mapping and prior to said adding said definition of said new UML profile, said computer system determining said new UML profile exists in a UML-based modeling tool and in a file system;

based on said new UML profile existing in said UML-based modeling tool and in said file system, said computer system determining whether a new stereotype included in said plurality of new stereotypes exists in said new UML profile;

in response to said determining said new stereotype does not exist in said new UML profile, said computer system performing the steps of:

adding a name of said new stereotype and a name of said new UML profile to a collection variable;

determining names of all other new stereotypes included in said plurality of new stereotypes are included in said collection variable;

subsequent to said adding said name of said new stereotype and said determining names of all other new stereotypes are included in said collection variable, retrieving from said collection variable said name of said new stereotype, said names of all other new stereotypes; and initiating display of a list of stereotypes based on said retrieved name of said new stereotype and said retrieved names of all other new stereotypes.

8. The computer system of claim 2, wherein said method further comprises:

subsequent to said adding said definition of said new UML profile to said UML model, said computer system determining a first meta-class included in said first meta-classes is different from a respective second meta-class included in said second meta-classes; and based on said first meta-class being different from said second meta-class, said computer system performing the steps of:

retrieving one or more relationships of an instantiation of said first meta-class;

creating an instantiation of said second meta-class having a type specified by said second meta-class;

subsequent to said retrieving said one or more relationships and said creating said instantiation of said second meta-class, copying said one or more relationships to said instantiation of said second meta-class; and removing said instantiation of said first meta-class from said UML model, wherein said adding said new stereotypes to said new UML profile includes applying a new stereotype included in said plurality of new stereotypes to said instantiation of said second meta-class.

9. The program product of claim 3, wherein said method further comprises:

subsequent to said determining said mapping and prior to said adding said definition of said new UML profile, said computer system determining said new UML profile exists in a UML-based modeling tool and in a file system;

based on said new UML profile existing in said UML-based modeling tool and in said file system, said computer system determining whether a new stereotype included in said plurality of new stereotypes exists in said new UML profile;

in response to said determining said new stereotype does not exist in said new UML profile, said computer system performing the steps of:

adding a name of said new stereotype and a name of said new UML profile to a collection variable;

determining names of all other new stereotypes included in said plurality of new stereotypes are included in said collection variable;

subsequent to said adding said name of said new stereotype and said determining names of all other new stereotypes are included in said collection variable, retrieving from said collection variable said name of said new stereotype, said names of all other new stereotypes; and initiating display of a list of stereotypes based on said retrieved name of said new stereotype and said retrieved names of all other new stereotypes.

10. The program product of claim 3, wherein said method further comprises:

subsequent to said adding said definition of said new UML profile to said UML model, said computer system determining a first meta-class included in said first meta-classes is different from a respective second meta-class included in said second meta-classes; and based on said first meta-class being different from said second meta-class, said computer system performing the steps of:

retrieving one or more relationships of an instantiation of said first meta-class;

creating an instantiation of said second meta-class having a type specified by said second meta-class;

subsequent to said retrieving said one or more relationships and said creating said instantiation of said second meta-class, copying said one or more relationships to said instantiation of said second meta-class; and removing said instantiation of said first meta-class from said UML model, wherein said adding said new stereotypes to said new UML profile includes applying a new stereotype included in said plurality of new stereotypes to said instantiation of said second meta-class.

11. The process of claim 2, wherein said method further comprises:

subsequent to said determining said mapping and prior to said adding said definition of said new UML profile, said computer system determining said new UML profile exists in a UML-based modeling tool and in a file system;

based on said new UML profile existing in said UML-based modeling tool and in said file system, said computer system determining whether a new stereotype included in said plurality of new stereotypes exists in said new UML profile;

in response to said determining said new stereotype does not exist in said new UML profile, said computer system performing the steps of:

adding a name of said new stereotype and a name of said new UML profile to a collection variable;

determining names of all other new stereotypes included in said plurality of new stereotypes are included in said collection variable;

subsequent to said adding said name of said new stereotype and said determining names of all other new stereotypes are included in said collection variable, retrieving from said collection variable said name of said new stereotype, said names of all other new stereotypes; and initiating display of a list of stereotypes based on said retrieved name of said new stereotype and said retrieved names of all other new stereotypes.

12. The process of claim 2, wherein said method further comprises:

subsequent to said adding said definition of said new UML profile to said UML model, said computer system determining a first meta-class included in said first meta-classes is different from a respective second meta-class included in said second meta-classes; and based on said first meta-class being different from said second meta-class, said computer system performing the steps of:

retrieving one or more relationships of an instantiation of said first meta-class;

creating an instantiation of said second meta-class having a type specified by said second meta-class;

subsequent to said retrieving said one or more relationships and said creating said instantiation of said second meta-class, copying said one or more relationships to said instantiation of said second meta-class; and removing said instantiation of said first meta-class from said UML model, wherein said adding said new stereotypes to said new UML profile includes applying a new stereotype included in said plurality of new stereotypes to said instantiation of said second meta-class.

* * * * *